(12) United States Patent
Power, II et al.

(10) Patent No.: US 11,198,038 B1
(45) Date of Patent: Dec. 14, 2021

(54) TREE STICK CLIMBING STICK NESTING SYSTEM

(71) Applicant: Tethrd, Inc., Carver, MN (US)

(72) Inventors: Walter Ernest Power, II, Carver, MN (US); Gregory Alan Godfrey, Richmond Hill, GA (US); Shawn Paul Chadwick, Merrill, WI (US)

( * ) Notice: Subject to any disclaimer, the term of this patent is extended or adjusted under 35 U.S.C. 154(b) by 0 days.

(21) Appl. No.: 17/234,269

(22) Filed: Apr. 19, 2021

(51) Int. Cl.
*A63B 27/00* (2006.01)

(52) U.S. Cl.
CPC .................... *A63B 27/00* (2013.01)

(58) Field of Classification Search
CPC ........................................................ A63B 27/00
See application file for complete search history.

(56) References Cited

U.S. PATENT DOCUMENTS

| | | | | |
|---|---|---|---|---|
| 6,138,792 A | * | 10/2000 | Morris | E06C 1/10 182/178.3 |
| 9,732,556 B2 | * | 8/2017 | Priest | E06C 1/381 |
| 2004/0216952 A1 | * | 11/2004 | Woller | E06C 1/34 182/93 |
| 2012/0125715 A1 | * | 5/2012 | Furseth | E06C 7/081 182/194 |
| 2016/0024843 A1 | * | 1/2016 | Niemela | E06C 1/381 182/129 |
| 2018/0073298 A1 | * | 3/2018 | Hand | E06C 1/34 |

* cited by examiner

*Primary Examiner* — Alvin C Chin-Shue

(57) ABSTRACT

A tree stick mount attachment assembly includes a tree stick body. A panel has a front side, a back side, and a perimeter edge extending between the front and back sides. The backs side faces and is attached to the tree stick body. The perimeter edge has a plurality of slots therein and each of the slots extends through the front and back sides. The slots removably receive a tether extending around the tree to retain the tree stick body on the tree. The tether is attached to the tree stick body and extended around the tree. Thereafter, the tether is then extended into the slots to secure the tree stick body to the tree.

3 Claims, 16 Drawing Sheets

TREE STICK CLIMBING STICK NESTING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tree stick attachment articles and more particularly pertains to a new tree stick attachment article for securing a tree stick to a tree with the use of rope.

(2) Description of Related Art Including Information Disclosed Under 37 CFR 1.97 and 1.98

The prior art relates to tree stick and tree stick attachment methods. Tree sticks are articles often utilized by hunters to create a temporary ladder or foothold on a tree while ascending and descending from a tree stand. The hunter will use a plurality of tree sticks and secure them vertically together while attaching each tree stick, individually, to a tree. Tree stick attachments which often include a "button" attached to a main body of a tree stick. To the button may be secured the ends of a strap after the strap has been extended around a tree. The strap will often include a buckle and may further include a cam mechanism to tighten the strap and secure in place. While such structures and methods do effectively retain a tree stick on a tree, the weight of the straps and tightening hardware becomes an issue as hunters strive to lower the total weight of all gear needed to properly hunt from a tree. Cams, clips, ratchets and the like are also more prone to causing excess noise which is to be avoided when hunting. For these reasons, a new assembly and method has been devised herein to solve the problems associated with mounting tree sticks while retaining the benefits of those systems.

BRIEF SUMMARY OF THE INVENTION

An embodiment of the disclosure meets the needs presented above by generally comprising a tree stick body. A panel has a front side, a back side, and a perimeter edge extending between the front and back sides. The backs side faces and is attached to the tree stick body. The perimeter edge has a plurality of slots therein and each of the slots extends through the front and back sides. The slots removably receive a tether extending around the tree to retain the tree stick body on the tree. The tether is attached to the tree stick body and extended around the tree. Thereafter, the tether is then extended into the slots of the panel to secure the tree stick body to the tree.

Another embodiment of the disclosure includes a method of positioning a tree stick body against a tree such that a panel attached to the tree stick faces away from the tree. A tether attached to the tree stick is extended around the tree and around a connection point between the tree stick and the panel. The tether is then positioned into slots in a perimeter edge of the panel to retain the tree stick on the tree.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
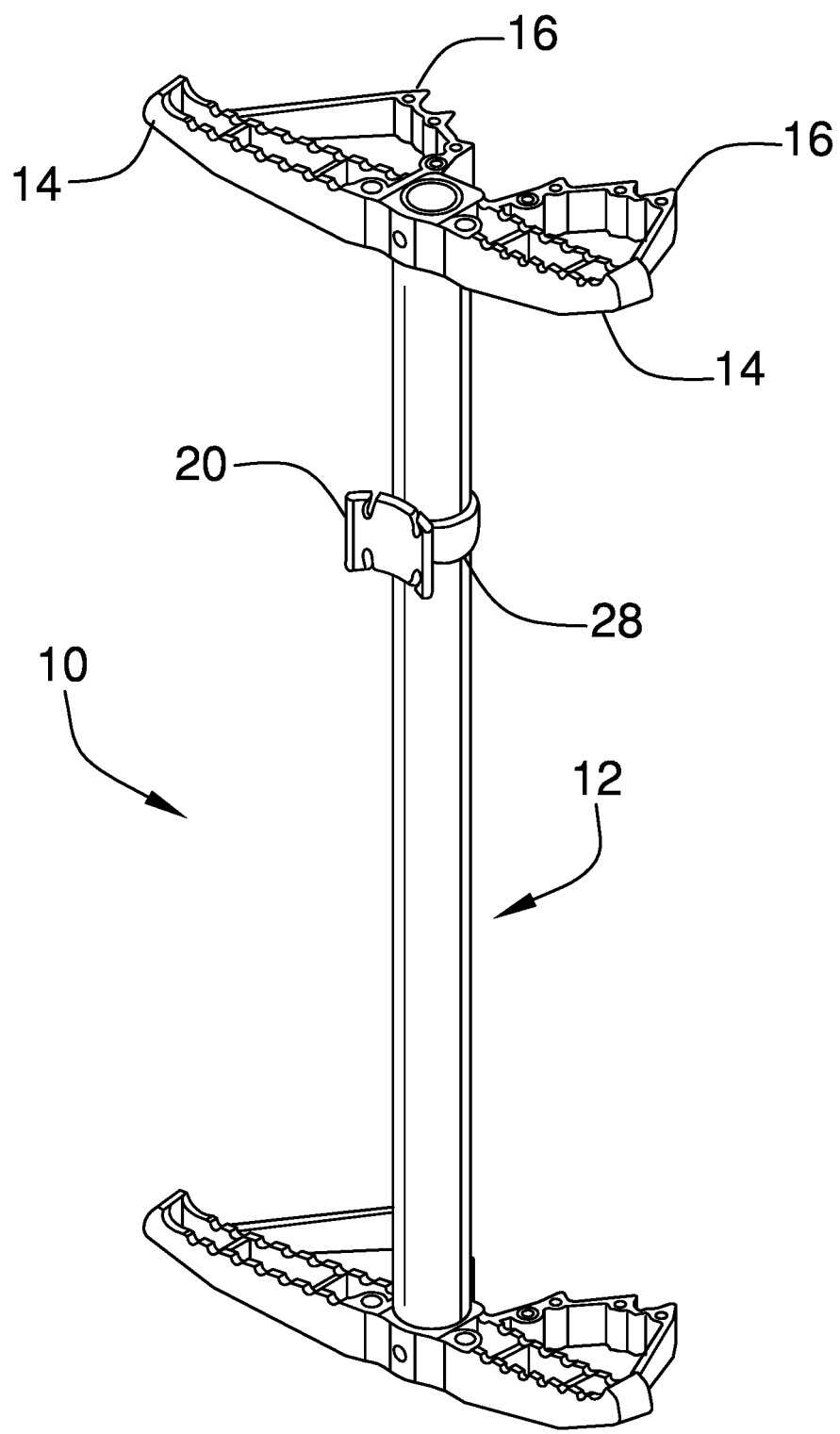
FIG. 1 is a front isometric view of a tree stick mount attachment assembly and method according to an embodiment of the disclosure.
Figure 2:
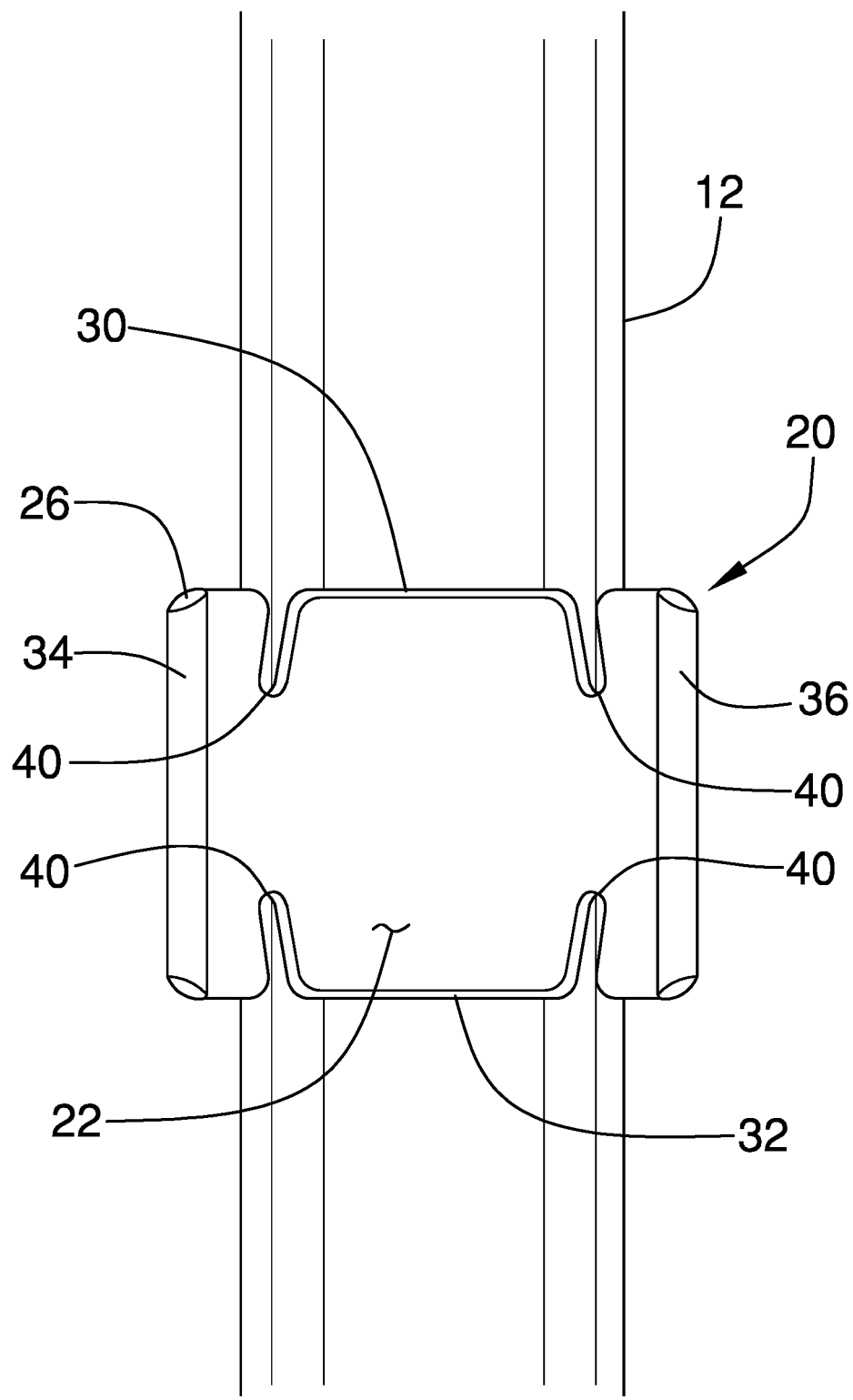
FIG. 2 is a front view of an embodiment of the disclosure.
Figure 3:
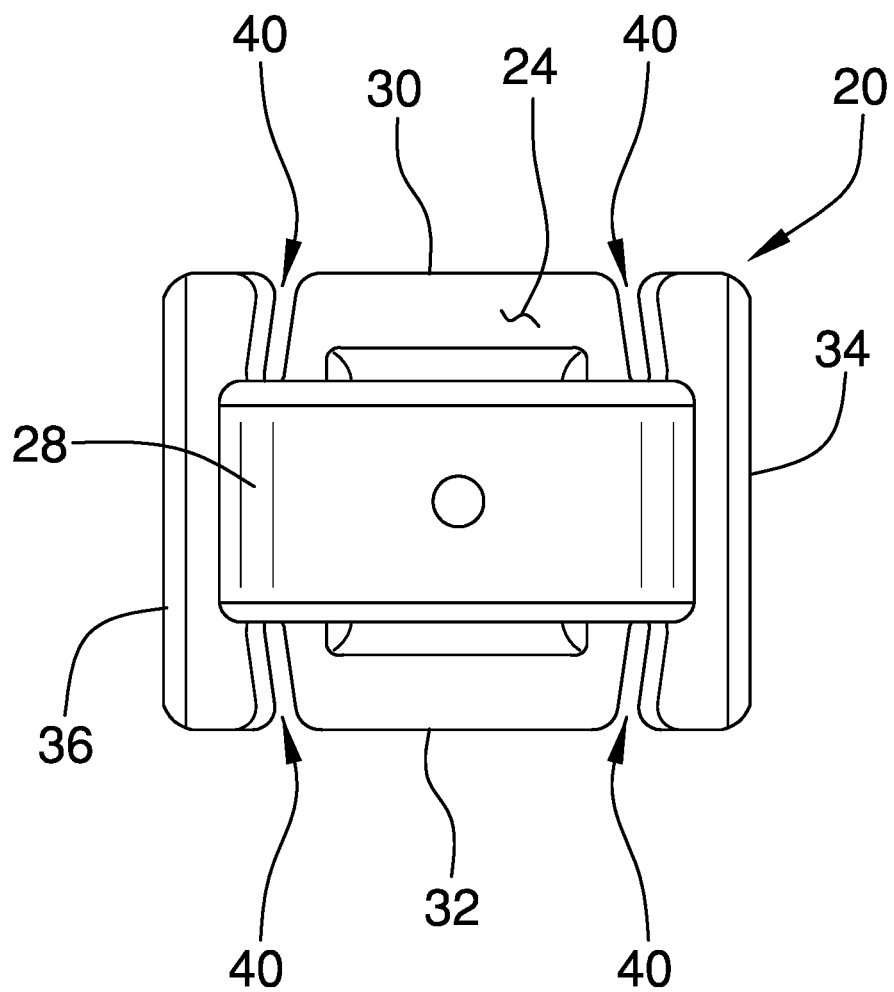
FIG. 3 is a rear view of an embodiment of the disclosure.
Figure 4:
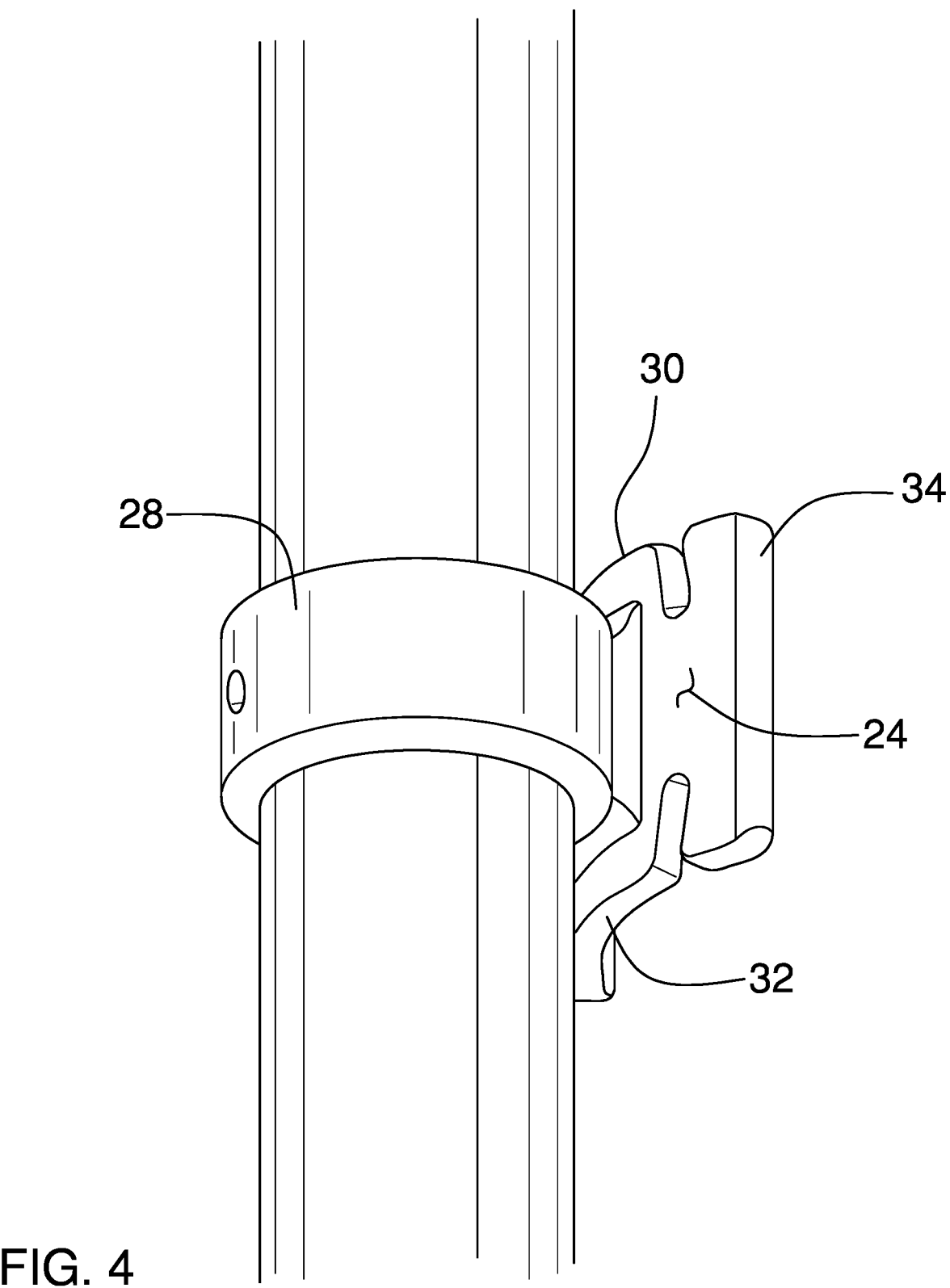
FIG. 4 is a rear isometric view of an embodiment of the disclosure.
Figure 5:
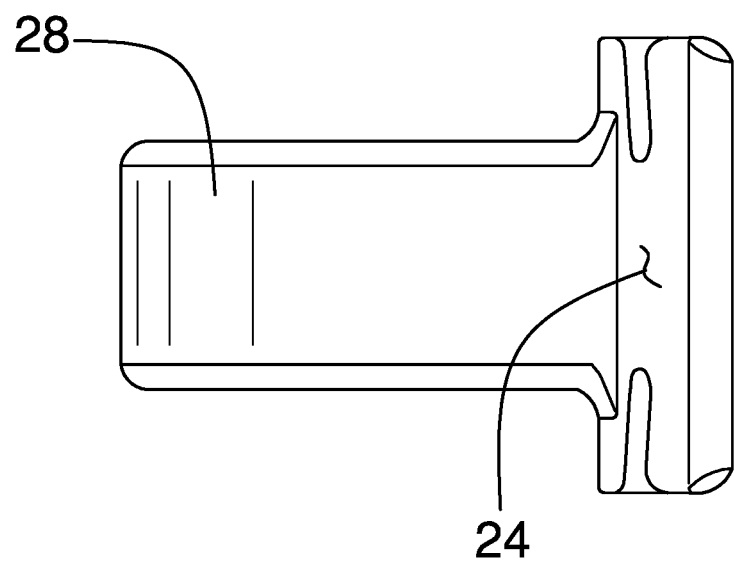
FIG. 5 is a side view of an embodiment of the disclosure.
Figure 6:
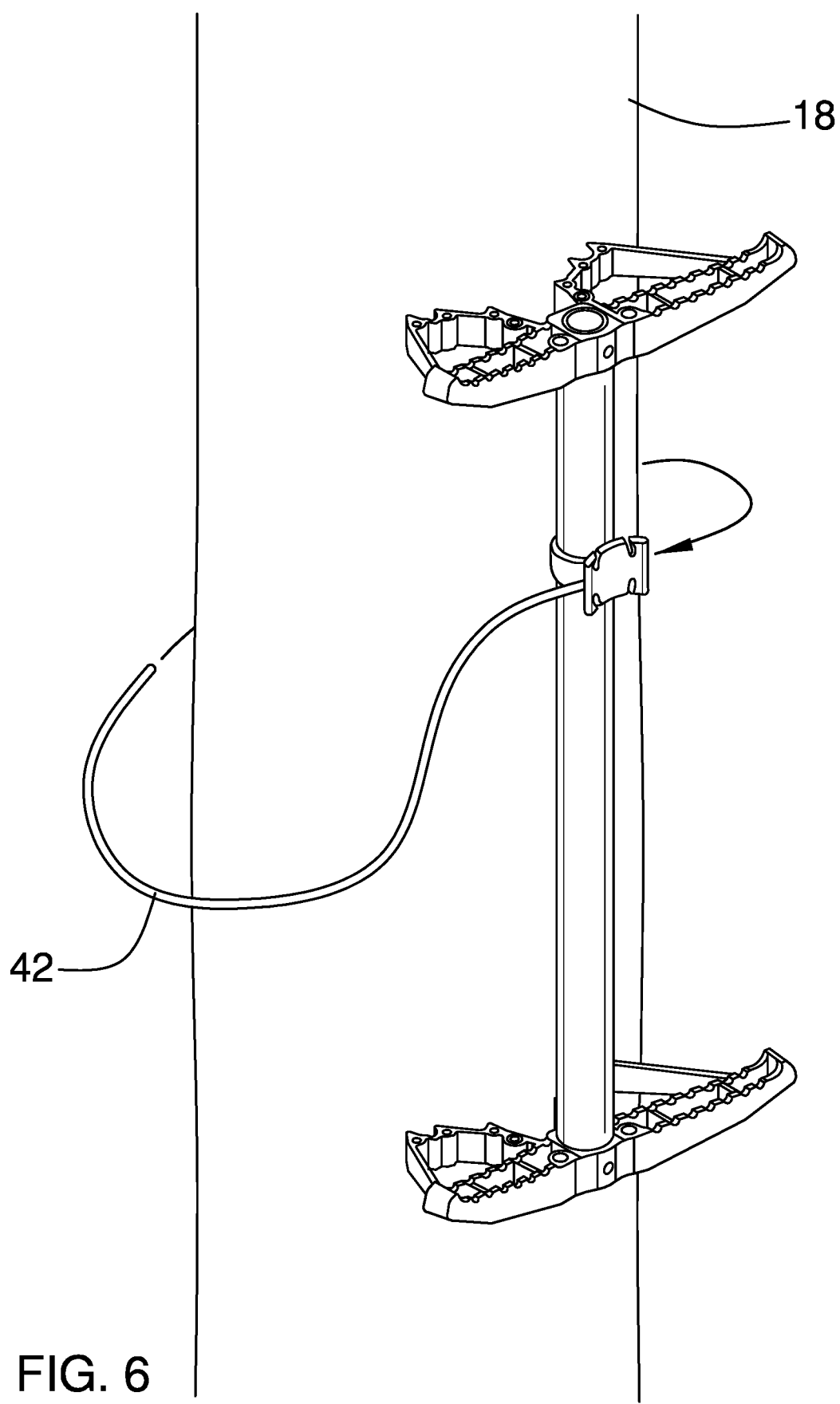
FIG. 6 is a front isometric in-use view of an embodiment of the disclosure.

With reference now to the drawings, and in particular to FIGS. 1 through 16 thereof, a new tree stick attachment article embodying the principles and concepts of an embodiment of the disclosure and generally designated by the reference numeral 10 will be described.

As best illustrated in FIGS. 1 through 16, the tree stick mount attachment assembly 10 and method generally comprises a structure that is attached to and used with a tree stick body 12. The term "tree stick" is conventionally used for sections of a modular ladder that is most typically used for climbing trees. The tree stick body includes footholds 14 that can be used to access a tree stand from which a person may hunt. The tree stick body 12 is a modular unit wherein a group of tree sticks forms a vertically elongated ladder but which can be removed from each other for storage and transportation purposes. Tree sticks are secured to trees 18 in a manner which prevents damage to the tree 18 and in an impermanent manner. Most frequently this is achieved by extended a strap around the tree 18 and the tree stick body 12 and may include the usage of a cam locking buckle.

In the instant assembly 10, a panel 20 is provided that has a front side 22, a back side 24, and a perimeter edge 26 extending between the front 22 and back 24 sides. The back side 24 faces and is attached to the tree stick body 12 in a conventional manner. While a fastener or adhesive bonding may be utilized to secure the panel 20 to the tree stick body 12, in one embodiment a ring 28 may be provided which is formed in a unitary manner with the back side 24. Alternatively the ring 28 may be attached to the back side 24 by mechanical means including fasteners, bonding and the like. The tree stick body 12 is extended through the ring 28 to retain the panel 20 on the tree stick body 12. While some of the figures depict a panel 20 having a generally rectangular configuration, it should be understood that other shapes, including circles, may be utilized. Regardless, the panel 20 will have defined an upper edge 30, a lower edge 32, a first lateral edge 34 and a second lateral edge 36, wherein each of the upper 30, lower 32, first lateral 34 and second lateral 36 edges correspond to the typical orientation of the tree stick body 12. The panel 20 may be planar or the front side 22 may be concavely arcuate from the first lateral edge 34 to the second lateral edge 36. The panel 12 will be comprised of a rigid material including metals, plastics, carbon fiber, and other like materials having a high strength to weight ratio. The size of the panel 20 may vary but typically will have a greatest height from the lower edge 32 to the upper edge 30 between 0.5 inches and 4.0 inches, and a greatest width from the first lateral edge 34 to the second lateral edge 36 between 0.5 inches and 5.0 inches.

The perimeter edge 26 has a plurality of slots 40 therein. The slots 40 extend through each of the front 22 and back 24 sides. Each of the slots 40 is configured to removably receive a tether 42 extending around the tree 18 to retain the tree stick body 12 on the tree 18 as will be further described below. Conventional tree sticks often include what is termed a button for engagement with straps and tie-downs. The panel 20 therefore functions as a replacement for a conventional button.

Figure 7:
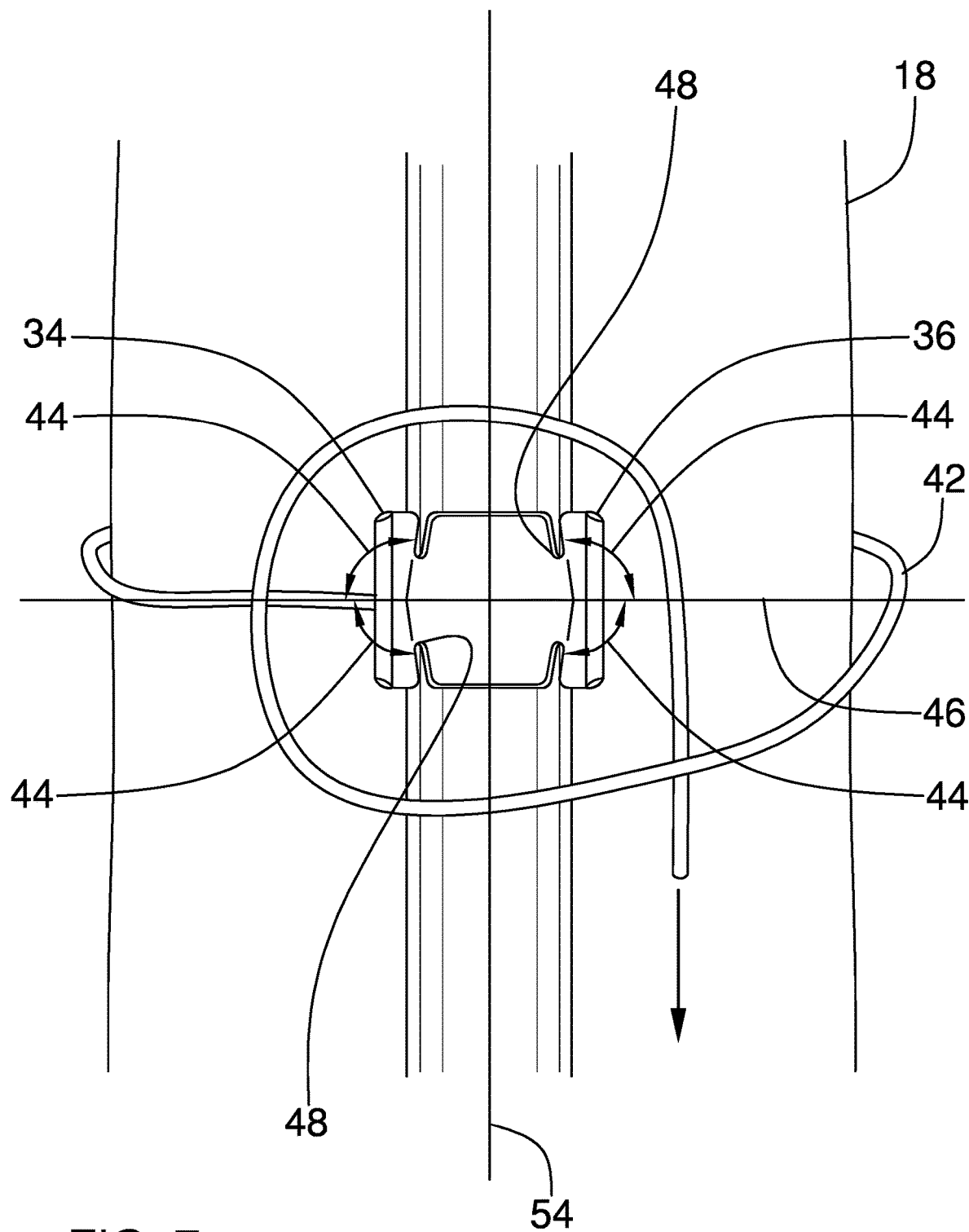
FIG. 7 is a front in-use view of an embodiment of the disclosure.
Figure 8:
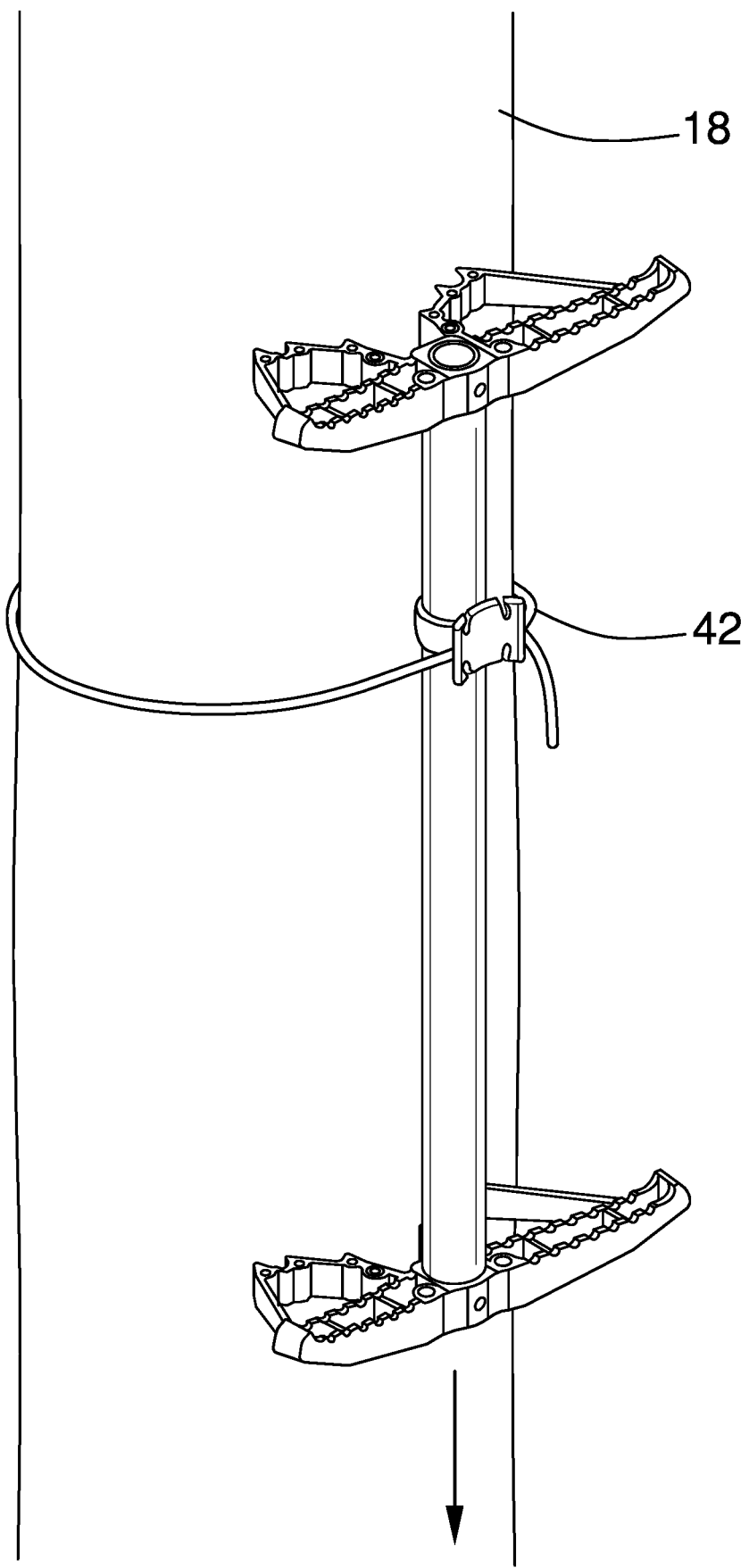
FIG. 8 is a front isometric in-use view of an embodiment of the disclosure.

The plurality of slots 40 will include at least two and up to five or more slots 40 wherein the slots 40 are spread out from each other along the perimeter edge 26. The slots 40 extend inwardly of the panel 20 and are generally angled toward either the first 34 or second 36 lateral edges. In one embodiment, the angles formed by the slots 40 are obtuse angles 44 taken with respect to a transversal line 46 extending through the first 34 and second 36 lateral edges. This transversal line 46 will approximately line up with and be parallel to the tether 42, when viewed head on, as it extends behind the panel 20 and around the tree 18. These obtuse angles 44, as can be seen in FIG. 7, open toward an adjacent one of the first 34 and second 36 lateral edges. Because the slots 40 are angled toward the first 34 and second 36 lateral edges, the tether 42 is pulled toward and taught against a base 48 of the slots 40 when the tether 42 is pulled tightly against the tree 18. Thus, the frictional engagement between the tether 42 and the panel 20 is increased due to the angle of the slots 40 while the angle 44 of the slots 40 also prevents the tether 42 from easily releasing from the slots 40 due to vectoring forces that pull the tether 42 toward the traversing line 46. Should the front side 22 be concavely arcuate, the first 34 and second 36 lateral edges being curved forwardly away from a horizontal plane will further enhance the retention capabilities of the slots 40.

It has also been found that the width of the slots 40 compared to a diameter of the tether 42 being utilized (i.e. a width dimension and a diameter dimension respectfully) will affect the friction between the tether 42 and the slots 40. The width of the slot 40 is generally measured where the tether 42 will sit within the slots 42 when used as described herein and therefore is typically adjacent to the base 48. The width of the slots 40 may be substantially uniform from the perimeter edge, however the base 48 of the slots may be convexly arcuate to prevent wear on the tether 42. Typically, the ratio of the diameter of the tether to the width of the slot will be at least 0.8 and no greater than 2.5. The type of tether 42 used with the assembly 10 will affect the required ratio. Therefore, if the tether 42, for example, is comprised of ultra high molecular weight polyethylene (UHMWPE or UHWM), the ratio will preferably be greater than at least 1.0 due to the relatively lower coefficient of friction offered by these types of tethers 42.

Figure 9:
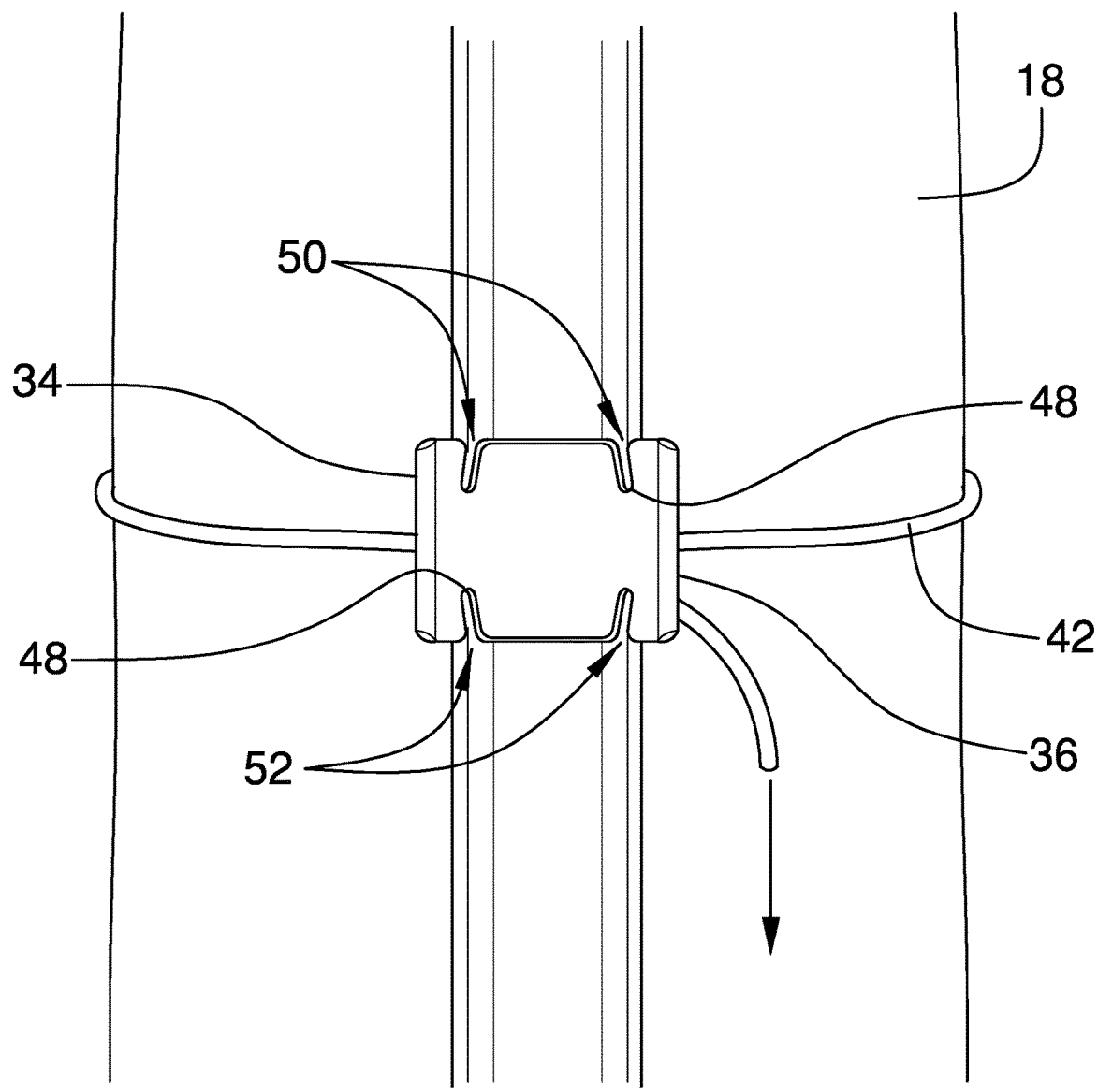
FIG. 9 is a front in-use view of an embodiment of the disclosure.

In some embodiments as illustrated in FIG. 9, the plurality of slots 40 include a pair of upper slots 50 and a pair of lower slots 52. The upper slots 50 are positioned above the transversal line 46 when it is positioned to bisect the front side 22. The upper slots 50 are positioned on opposite sides of a vertical line 54 bisecting the front side 22. The lower slots 52 are positioned below the transversal line 46 and are positioned on opposite sides of the vertical line 54. The panel 20, as stated above, may have a generally rectangular shape as shown in the figures such that the upper slots 50 are positioned in the upper edge 30 and the lower slots 52 are positioned in the lower edge 32. Panels 20 of other configurations such as circular, octagonal, triangular, etc., may be used wherein the positioning of the upper 50 and lower 52 slots are still relative to transversal 46 and bisecting 44 lines. It is further understood that the angles of the slots 40 are relative to the transversal line 46 and not to the shape of the panel 20 where first 34 and second 36 lateral edges may be more difficult to define, such as in the case of a triangular shaped panel.

In use, the tether 42 is securely attached at or adjacent to a connection point of the panel 20 and the tree stick body 12. The tether 42 will typically be a rope that may be conventional and may more specifically include lightweight attachment ropes comprised of UHMWPE or UHMW. Such materials are well known for their ability to afford very high strength to weight ratios and can be made relatively thin to facilitate engagement with the slots 40, and may include in one example wherein the slots 40 have a width of about 3/32 inches and the tether 42 has a diameter of 1/8 inches. The slots 40, or the panel 20, may be coated with a resiliently compressible material to further enhance the frictional engagement of the slots 40 with the tether 42. The tether 42 will have an attached end forming a loop extended around the connection point of the panel 20 and the tree stick body 12, or extended around the tree stick body 12 itself. Alternatively the tether 42 may be mechanically coupled or bonded to the panel 20 or the tree stick body 12. Regardless, the tether 42 will be attached to the tree stick body 12 either directly or indirectly and may include engagement with the panel 20 or ring 28.

Figure 10:
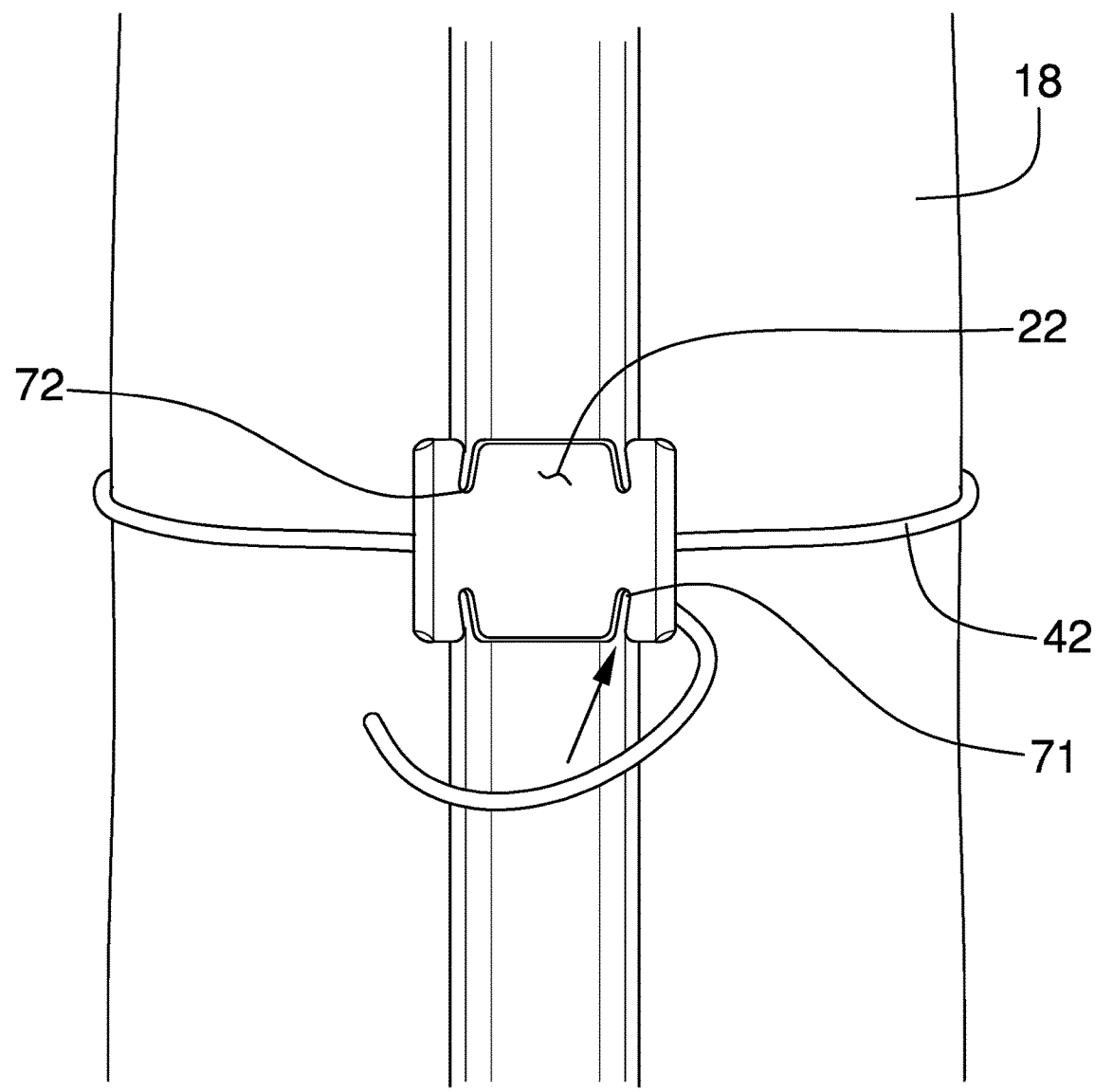
FIG. 10 is a front in-use view of an embodiment of the disclosure.
Figure 11:
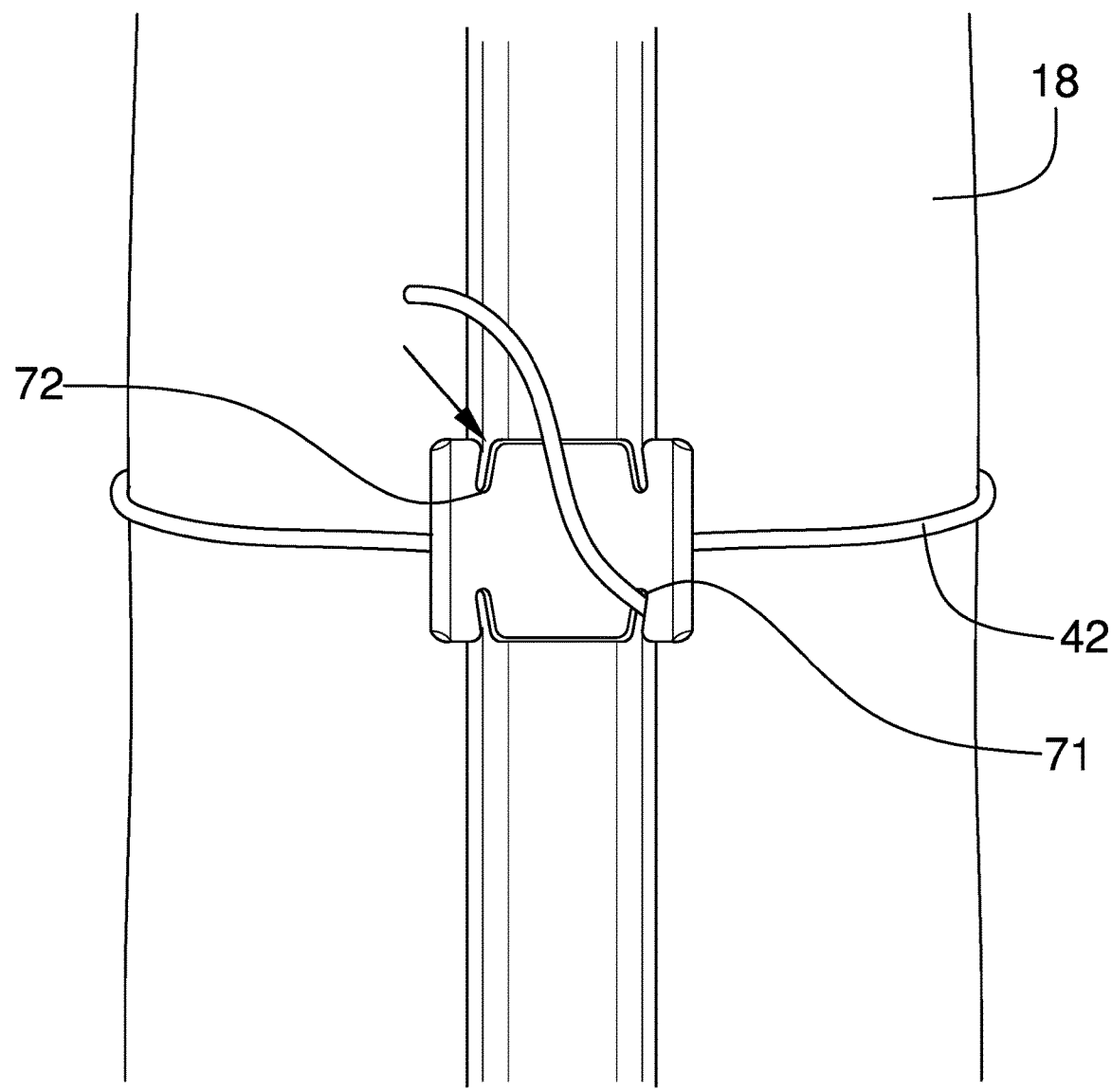
FIG. 11 is a front in-use view of an embodiment of the disclosure.
Figure 12:
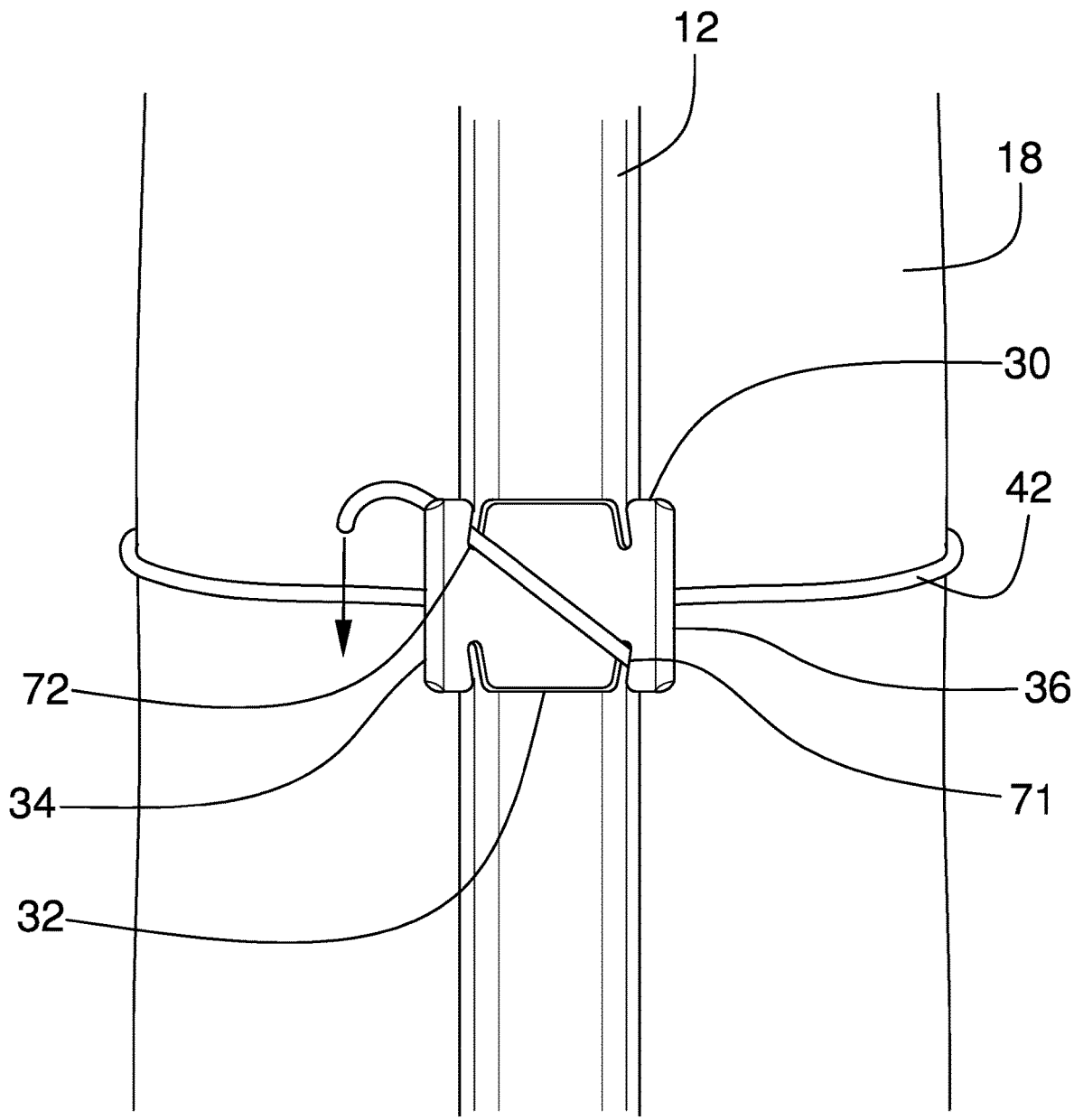
FIG. 12 is a front in-use view of an embodiment of the disclosure.
Figure 13:
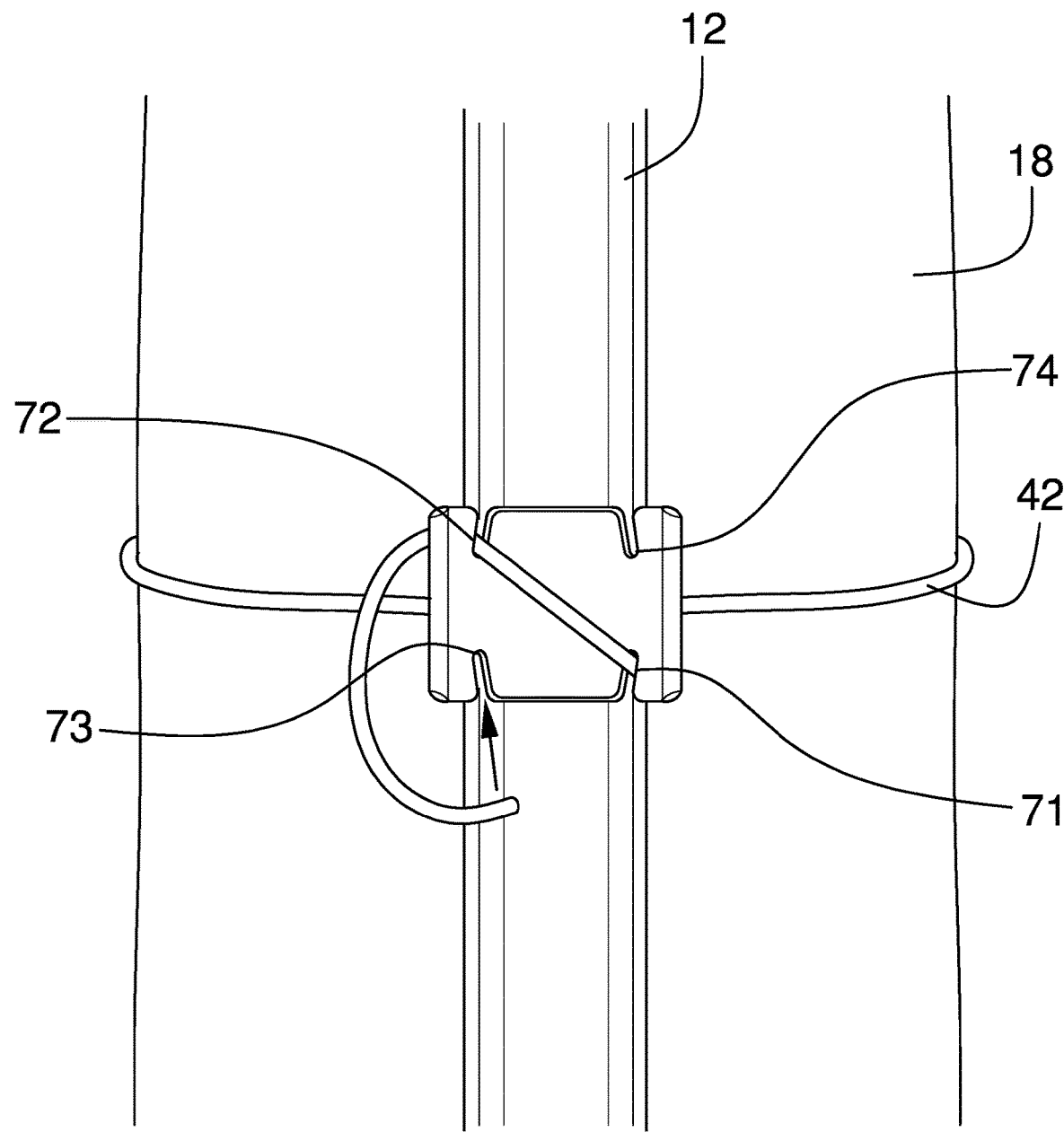
FIG. 13 is a front in-use view of an embodiment of the disclosure.
Figure 14:
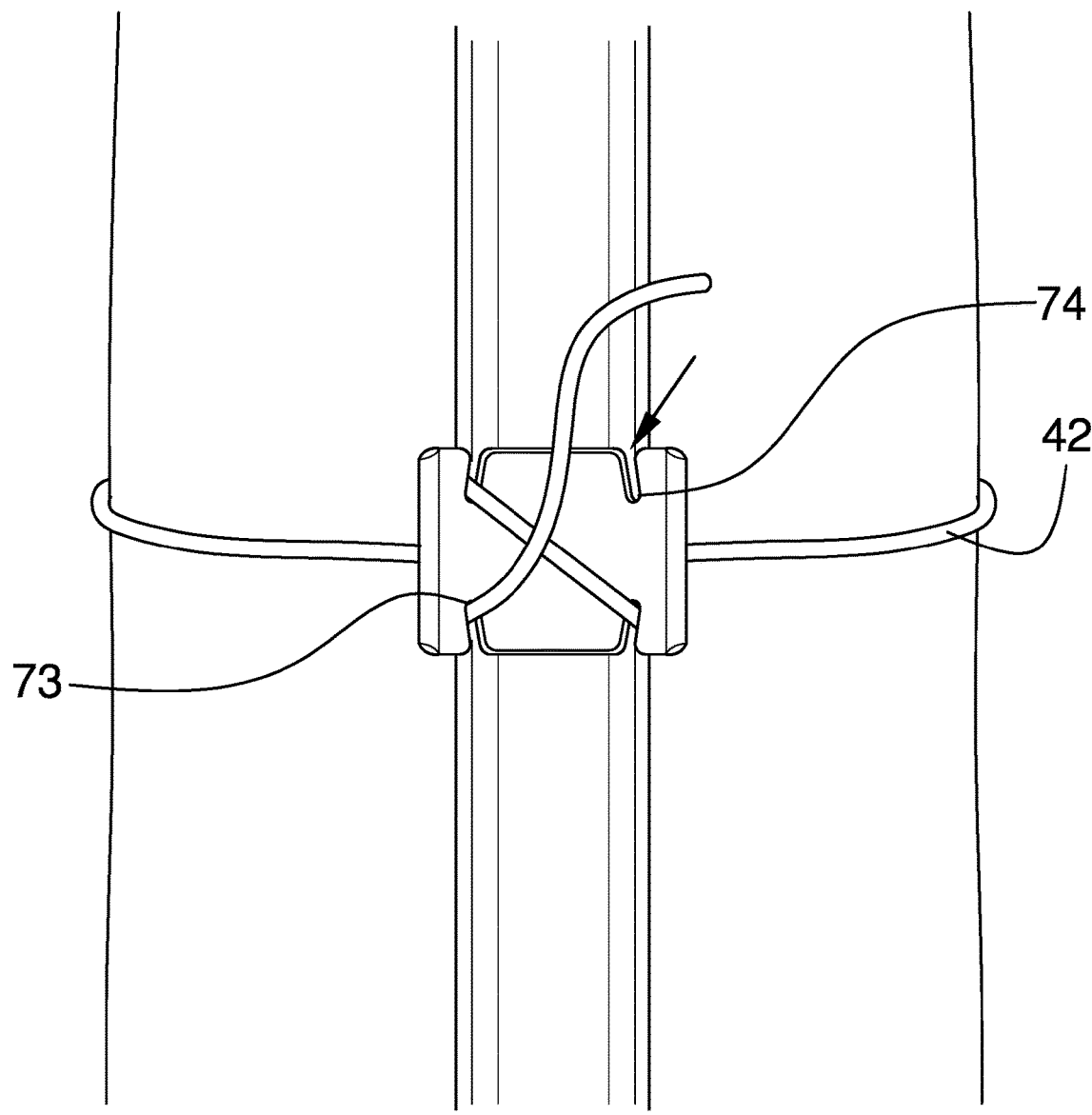
FIG. 14 is a front in-use view of an embodiment of the disclosure.
Figure 15:
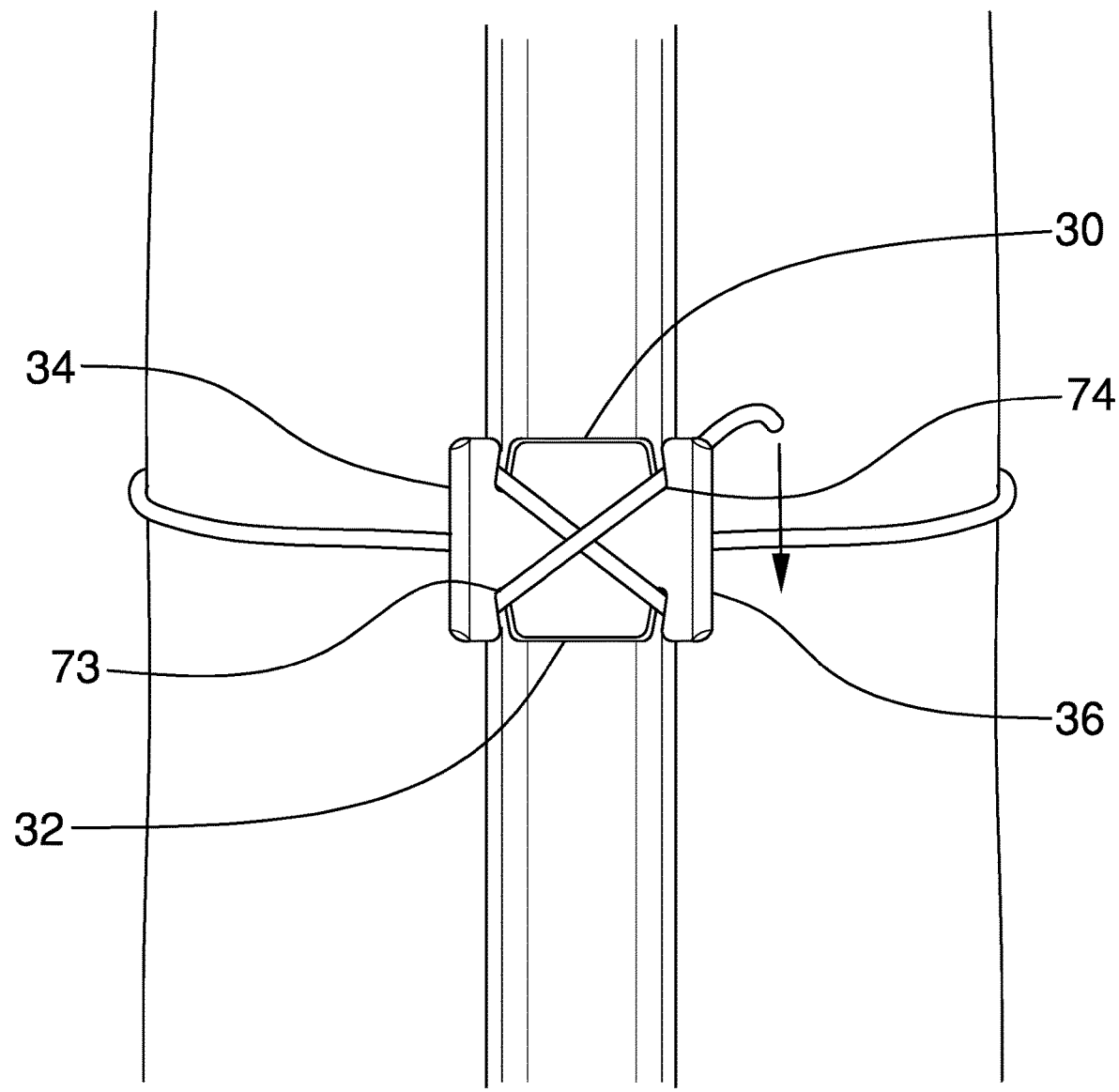
FIG. 15 is a front in-use view of an embodiment of the disclosure.
Figure 16:
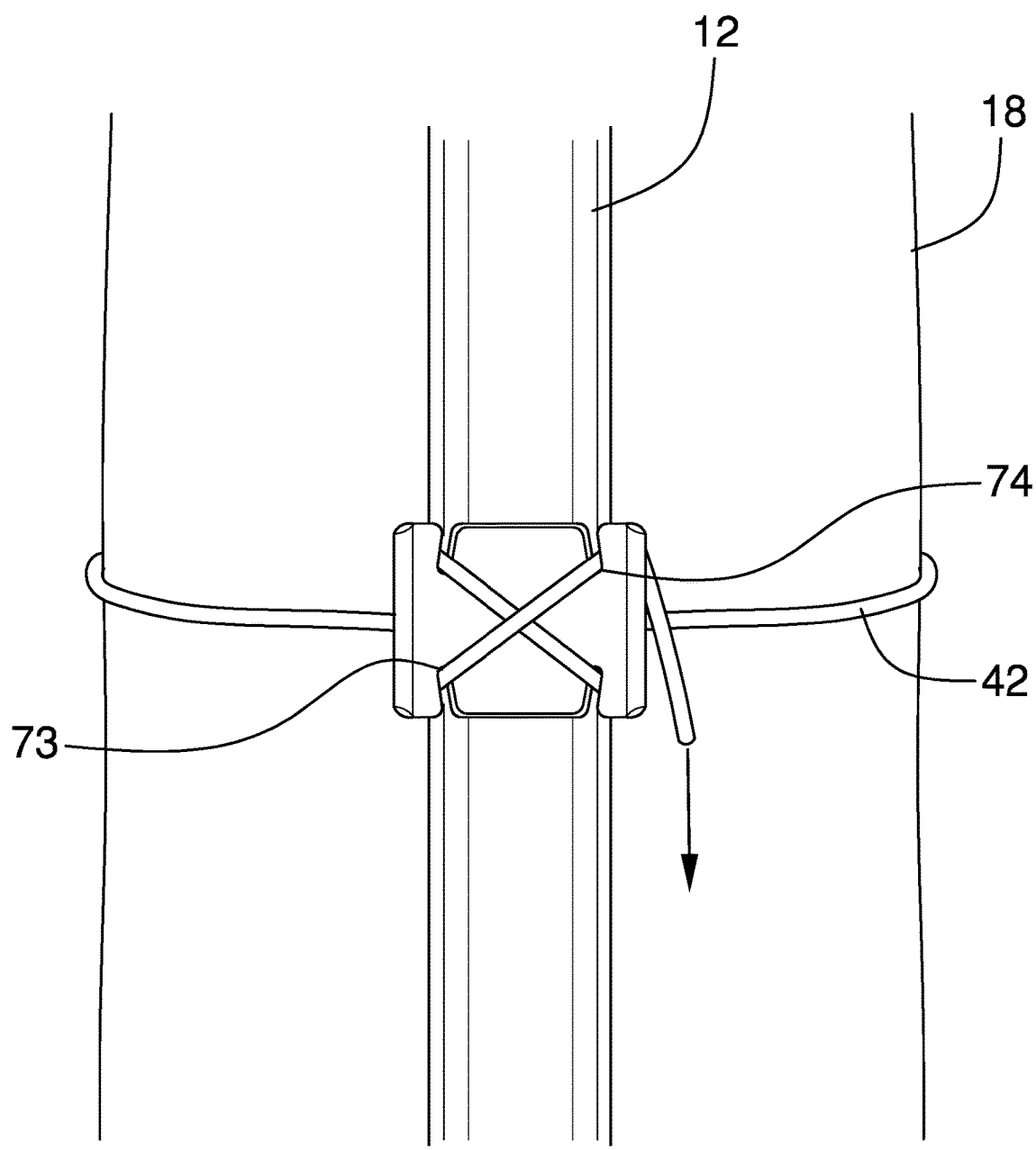
FIG. 16 is a front in-use view of an embodiment of the disclosure.

While other methods/order of slot 40 engagement may be utilized, one embodiment of attaching the tree stick body 12 to the tree 18 is described below and depicted in FIGS. 6-16. In this example the slots 40 have been numbered to facilitate the attached description. For this embodiment the tether 42 is extended away from the first lateral edge 34 and around the tree 18. The tether 42 is then wrapped around the connection point between the panel 20 and the tree stick body 12 so that tether 42 extends downwardly away from the second lateral edge 36 (FIGS. 6-9). The tether is then extended upwardly, from the back side 24, through a first slot 71 positioned in the lower edge 32 adjacent to the second lateral edge 36, and then extended across the front side 22 of the panel 20 and inserted into a second slot 72 positioned in the upper edge 30 adjacent to the first lateral edge 34 (FIGS. 10-12). The tether 42 is next run along the back side 24 and up into a third slot 73 in the lower edge 32 adjacent to the first lateral edge 34 and over the front side 22 to finally be inserted into a fourth slot 74 in the upper edge 30 adjacent to the second lateral edge 36. The tether 42 is then pulled tightly down along the back side 24 toward the lower edge 32 adjacent to the second lateral edge 36 (FIGS. 13-16). The cumulative friction created between the abutting portions of the tether 42 upon itself as well as the friction between the tether 42 and the slots 40 on the panel 20 will typically retain the tether 42 in place without further adjustment.

Once the tether 42 has been secured, the tree stick body 12 is pulled downwardly against tree 18 to ensure that tree stand-offs 16 on the tree stick body 12 firmly engage the tree 18 and to pull the tether 42 tightly against the tree 18. This action in turn further tightens the tether 42 on the panel 20 and secures the tree stick body 12 to the tree 18. The user of the assembly 10 may then later reverse the tether 42 tying operation explained above to remove the tree stick body 12 from the tree 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A method of attaching a tree stick to a tree including the steps of:
    positioning a tree stick body against a tree such that a panel attached to the tree stick faces away from the tree;
    extending a tether attached to the tree stick around the tree and around a connection point between the tree stick and the panel; and
    positioning the tether into slots in a perimeter edge of the panel to retain the tree stick on the tree.

2. The method of attaching a tree stick to a tree according to claim 1, wherein the step of positioning the tether into the slots in the perimeter edge of the panel further includes positioning the tether into four of the slots, the perimeter edge having an upper, a lower edge, a first lateral edge and a second lateral edge, the slots including a first slot, a second slot, a third slot and a fourth slot.

3. The method of attaching a tree stick to a tree according to claim 2, wherein the step of positioning the tether into the slots includes:
    extending the tether from a back side of the panel and upwardly into the first slot being positioned in the lower edge adjacent to the second lateral edge;
    extending the tether across a front side of the panel and inserting the tether downwardly into the second slot being positioned in the upper edge adjacent to the first lateral edge
    extending the tether along the back side an upwardly into the third slot positioned in the lower edge positioned adjacent to the first lateral edge;
    extending the tether over the front side and inserting the tether downwardly into the fourth slot positioned in the upper edge adjacent to the second lateral edge; and
    pulling the tether down along the back side toward the lower edge and adjacent to the second lateral edge.

* * * * *